W. H. BAYLESS.
Evaporating Pan.
No. 5,136.  Patented May 29, 1847.
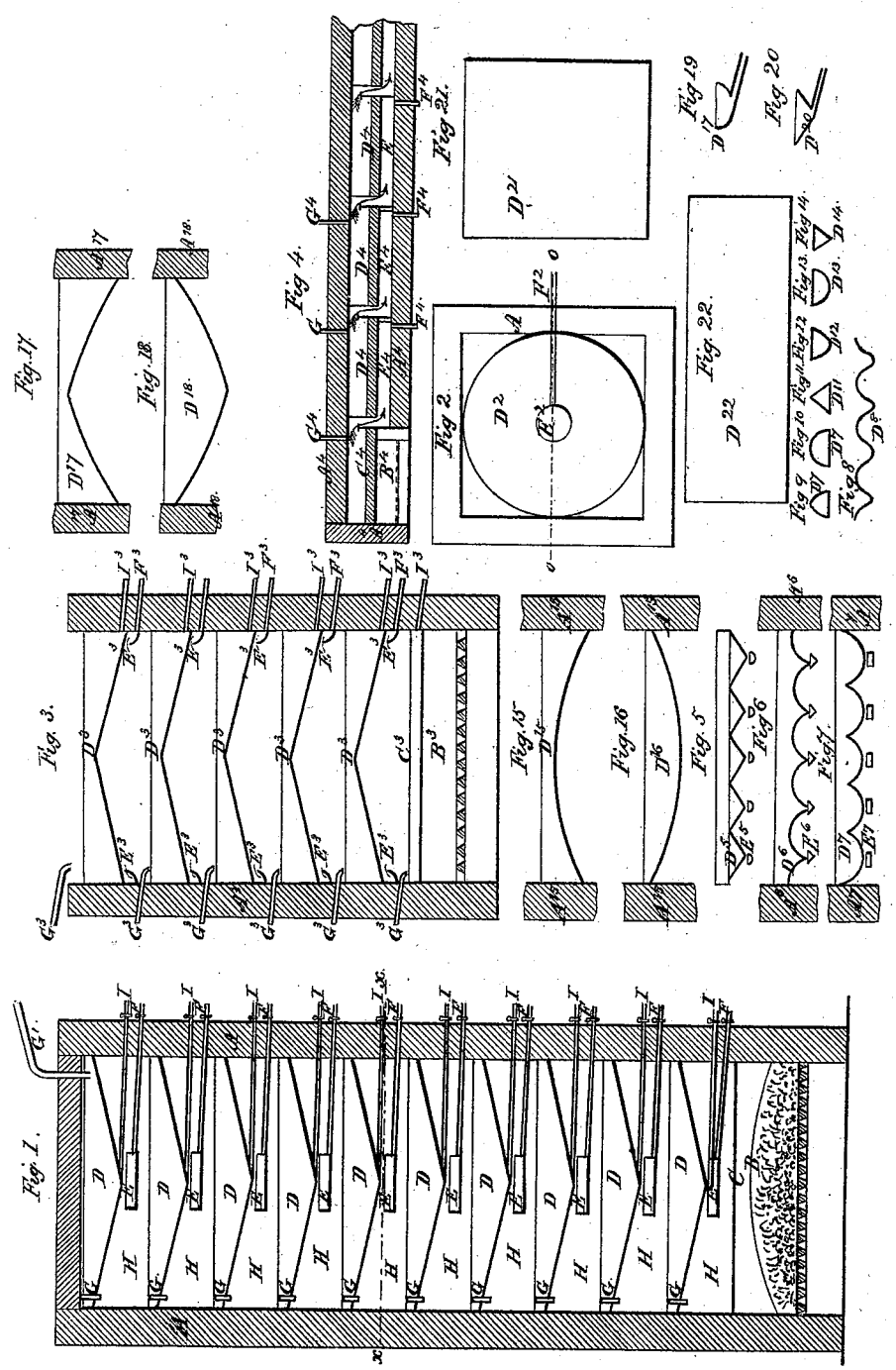

UNITED STATES PATENT OFFICE.

WM. H. BAYLESS, OF NEW YORK, N. Y.

IMPROVEMENT IN DISTILLING.

Specification forming part of Letters Patent No. 5,136, dated May 29, 1847.

*To all whom it may concern:*

Be it known that I, WILLIAM H. BAYLESS, of the city, county, and State of New York, have invented a new and useful Mode of Evaporating, Distilling, and Condensing, which is described as follows, reference being had to the annexed drawings of the same, making part of this specification.

Figure 1 is a vertical section of the apparatus on the dotted line *o o* of Fig. 2. Fig. 2 is a horizontal section on the dotted line *x x* of Fig. 1.

The nature of my invention and improvement consists in forming and arranging the vessels or receivers D, designed to contain the article to be evaporated, distilled, or condensed so that the heat of the steam or vapor arising from a boiler, C, arranged in a common furnace, B, shall be made to act against the bottom or sides of a vessel D, composed of some good conductor of heat—such as copper—containing a liquid or other solution to be evaporated or distilled, the heat of the vapor or steam arising from said liquid in said vessel being in turn made to act against the bottom or sides of a second similar vessel D containing a similar liquid or solution, and so on to any required number of vessels D, placed or arranged one above another, or in any convenient way in a tight case or room, A, or other suitable structure, made of an oblong or round or other figure or shape of some good non-conducting material—such as brick or wood—a communication being opened from one vessel to another throughout the whole series by means of vertical pipes G, open at both ends, passing through the bottoms of said vessels D, the upper ends of said pipes or tubes being a little below the upper edges or the level of the tops of the vessels D or evaporators, so that when the upper vessel D is filled nearly to the top level (which is effected by the pipe G' leading from the vessel or receiver containing the article to be evaporated) the liquid will commence running from the top vessel into the next vessel below it, and so on, passing through the several connecting-pipes G until all the vessels D and boiler C are filled to the required levels at which they are kept by keeping up the supply through the pipe G', the bottoms of the several evaporators D being made inclining at any suitable angle for the purpose of discharging the condensed vapor into suitable receivers, E, placed below them, provided with suitable pipes, F, passing through the wall of the cases for conveying the condensed vapor wherever desired.

A is the case, room, or structure in which the furnace, boiler, evaporators, receivers, discharge-pipes, supply-pipes, eduction-tubes, and other parts are placed, made of a suitable non-conducting material, of an oblong, round, or other form, and of any convenient size, whole or in sections, with suitable doors by which to obtain ready access to the interior.

B is the furnace, made in the usual manner.

C is a common boiler, open at top.

D are the evaporators, made of copper or other good conductor of heat, in the shape of an inverted cone or other more suitable form.

E are the receivers for catching the condensed vapors falling from the bottom of the evaporators.

F are the discharge-pipes, leading from the receivers through the outside wall of the room for discharging the condensed vapors into proper receivers.

G are the supply-pipes for supplying the evaporators and boiler with the liquid to be evaporated, G' leading from the main receiver through the top of the case to the top evaporator.

H are spaces between the evaporator for the circulation of the steam.

I are pipes for emptying the evaporators of their contents, when required.

The evaporators are open on top, but may be closed, in which case the tops must be provided with suitable openings to let the steam pass into the spaces H beneath the several vessels.

The evaporators may be round or square, or of any required form on top, having their bottoms of a conical, pyramidal, spherical, horizontal, inclined, or other forms suitable for discharging the condensed vapors into the receivers, which may be placed in any position in the case most suitable for catching the condensed vapors, their discharging-pipes being arranged accordingly. Each evaporator may be provided with a separate supply-pipe, if preferred, leading through the side wall or walls of the case or room.

The several cases, furnaces, boilers, evaporators, receivers, discharge-pipes, supply-pipes, eduction-tubes, spaces for the circulation of the vapor or steam, might be made and arranged in other ways, substantially the same as that represented in Fig. 1, and which forms the subject of the present application. For instance, the evaporators might be made and arranged in the manner represented in Figs. 3, 4, 5, 6, 7, 8, 9, 10, 11, 12, 13, 14, 15, 16, 17, 18, 19, 20, 21, 22, or any other more suitable form, provided they remain substantially the same as that represented in Fig. 1. In case of distillation the receivers E are to be used for collecting or receiving the condensed vapor or spirit.

In the manufacture of salt the boilers D will contain the salt-brine, and the receivers E will receive the condensed vapors or steam which will arise from the heated brine.

In the evaporation of sugar or the evaporation of any chemical solution the receivers E will also be the receivers of the condensed vapors or steam.

The boilers or evaporators may be tight or open, as above stated, so as to carry on the evaporation at a higher degree of heat than boiling-point, if required.

The shape and size of the boilers, also the pipes for supplying them with the liquid or solution to be evaporated or distilled, and safety-valves and pipes for carrying off the condensed vapors or steam, and material of which they are constructed, are intended to be arranged to suit each particular case, as required.

What I claim as my invention, and desire to secure by Letters Patent, is—

The before-described mode of evaporating and distilling by means of a series of vessels, so formed and arranged in a non-conducting structure as to transmit the heat arising from the vapor or steam of a common boiler, such as C, Fig. 1, to the under surface or sides of a series of boilers, such as D, Fig. 1, in succession, by which the heat which is usually lost is made to produce a repetition of the evaporating operation to the bottoms or sides of an extra number of boilers D to any degree required, by which a great saving in the cost of fuel is effected in the process of evaporation or distillation, the steam or vapor being condensed and collected in vessels E in the interior of the external non-conducting case, A, as fully set forth in the foregoing specification.

W. H. BAYLESS.

Witnesses:
WM. P. ELLIOT,
ALBERT E. H. JOHNSON.